United States Patent [19]
McConnell

[11] Patent Number: 5,490,623
[45] Date of Patent: Feb. 13, 1996

[54] UTILITY BAG

[75] Inventor: Michael P. McConnell, Durham, N.H.

[73] Assignee: Talus Corporation, Portland, Me.

[21] Appl. No.: 354,967

[22] Filed: Dec. 13, 1994

[51] Int. Cl.[6] .............................. B60R 7/00; B60R 7/10; B60R 9/00; B60R 11/00
[52] U.S. Cl. .......................... 224/275; 224/277; 224/539; 224/549; 224/928; 206/233; 383/38; 297/188.06
[58] Field of Search ...................... 224/275, 277, 224/928, 539, 549; 248/95, 99; 211/86; 297/188.04, 188.05, 188.06, 188.07; 206/233; 383/38, 40, 41

[56] References Cited

U.S. PATENT DOCUMENTS

| D. 322,498 | 12/1991 | McClees et al. | D34/1 |
|---|---|---|---|
| 1,577,298 | 3/1926 | Roeller | 224/42.42 |
| 1,895,744 | 1/1933 | Arnold | 383/40 |
| 2,778,553 | 1/1957 | Satrom et al. | 224/42.42 |
| 2,778,554 | 1/1957 | Porkola | 224/42.46 |
| 2,798,650 | 7/1957 | Durham | 224/42.46 |
| 2,841,275 | 7/1958 | Schwimmer et al. | 206/233 |
| 2,925,172 | 2/1960 | Hopp | 206/19.5 |
| 3,133,690 | 5/1964 | Lui | 229/53 |
| 4,266,704 | 5/1981 | Swanson | 224/42.46 |
| 4,830,238 | 5/1989 | Widinski et al. | 224/928 |

Primary Examiner—Henry J. Recla
Assistant Examiner—Timothy L. Maust
Attorney, Agent, or Firm—Cesari and McKenna

[57] ABSTRACT

A portable utility bag has a plurality of flexible walls defining a first receptacle having an opening thereinto and a plurality of flexible panels attached to each other and to at least some of the walls to define a second receptacle adjacent to the first receptacle and having an opening thereinto oriented perpendicular to the opening into the first receptacle. A strap suspends the bag so that the opening into the first receptacle faces upward. The second receptacle is designed to hold a container and is collapsible when not being used.

5 Claims, 1 Drawing Sheet

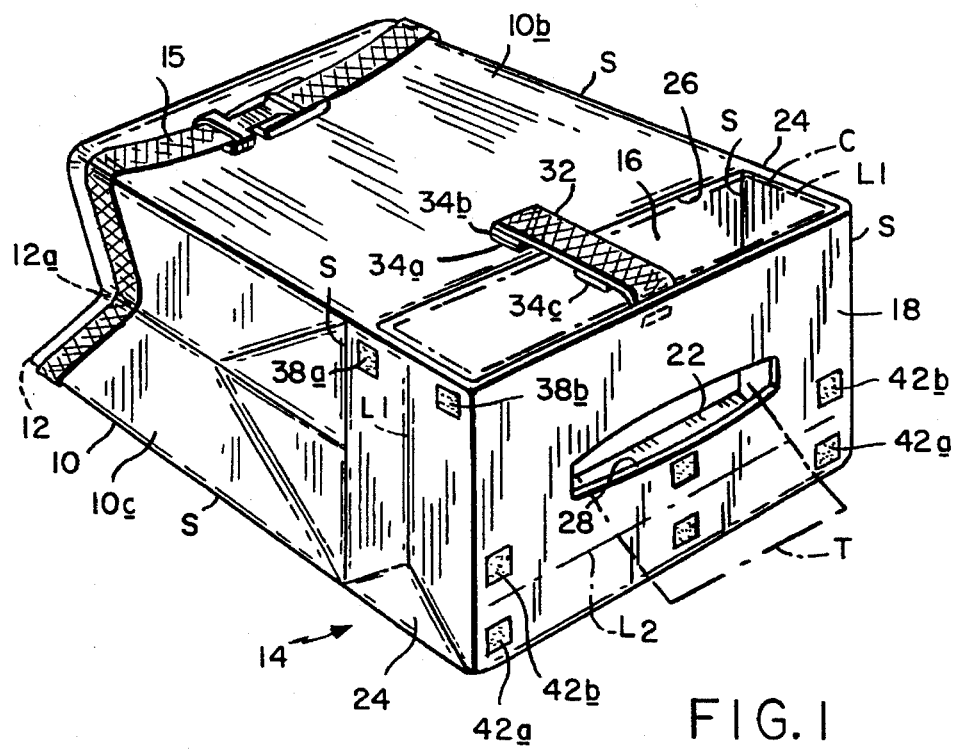
FIG. 1
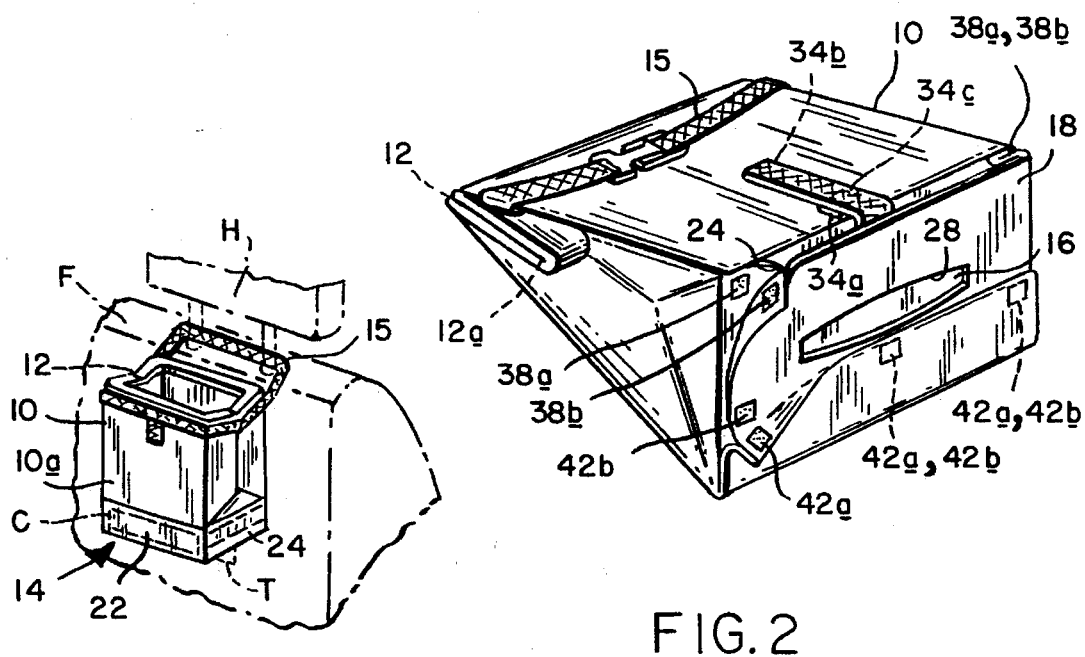
FIG. 3
FIG. 2

UTILITY BAG

This invention relates to a utility bag which may function as a holder for a dispenser for dispensing fresh articles as well as a receptacle for receiving those articles after they have been used. It relates especially to a litter bag for placement in automobiles and the like for dispensing facial tissues and for temporarily storing used tissues and other litter. It should be understood however, that the utility bag may also be used to dispense and receive other disposable articles such as plastic liners for the bag itself, paper towels and the like.

Conventional litter bags of the general type of which we are concerned are disadvantaged in that they do not have a dispensing capability. Also, they are not as strong as they might be in that their bottom walls invariably comprise a single layer or ply of material which tends to sag under a full load of litter. Such distortion of the bag under a load also spoils the appearance of the bag.

SUMMARY OF THE INVENTION

Accordingly, the present invention aims to provide an improved utility bag capable of dispensing as well as temporarily storing disposable articles.

Another object of the invention is to provide a bag of this type which is stronger and more serviceable than prior comparable bags of this general type.

Still another object of the invention is to provide a utility bag which maintains its appearance when filled with litter.

A further object of the invention is to provide such a bag which can be manufactured in quantity at relatively low cost.

Other objects will be obvious and will, in part, appear hereinafter. The invention accordingly comprises the features of construction, combination of elements and arrangement of parts which will be exemplified in the following detailed description, and the scope of the invention will be indicated in the claims.

Briefly, our bag is made substantially entirely of flexible sheet material. It has a front wall, a rear wall and a pair of opposite side walls which are connected together by a reinforcing bottom wall structure. The bag is open at the top and is provided with a frame around that opening which is hinged so that by folding the frame, the opening into the bag may be closed.

The bag bottom wall structure comprises an upper panel connected to the bag walls and which forms the bottom wall of the bag, a coextensive bottom panel and front and side panels connecting the bottom panel to the upper panel thereby forming an enclosure capable of holding a container for disposable articles such as facial tissues. A suitable opening is provided in the bottom panel so that the tissues are accessible at the underside of the bag. When the bag is being used thusly to dispense articles, the panels comprising the bottom wall structure and the container enclosed and supported thereby stiffen and reinforce the underside of the bag so that the bag does not tend to sag even when it is full of waste material or litter.

In accordance with the invention, the side panels of the bottom wall structure are foldable inwardly and the bottom panel is foldable along its length so that the bottom panel can be folded substantially flush against the upper panel. Also, means are provided for securing those two panels together so as to form a two-ply reinforcing bottom wall for the bag when the bag's dispensing capability is not being utilized.

When not in use, the bag can be folded up into a relatively flat compact package which can be shipped and stored in a minimum amount of space. As will be described in more detail later, our utility bag can be made with a minimum number of fabric parts or panels which can be assembled by conventional means such as heat seals or stitching. Therefore, the bag can be manufactured in quantity at relatively low cost.

BRIEF DESCRIPTION OF THE DRAWING

For a fuller understanding of the nature and objects of the invention, reference should be had to the following detailed description taken in connection with the accompanying drawing, in which:

FIG. 1 is a bottom, rear isometric view of a utility bag incorporating the invention, with the bag being shown in its extended and open condition;

FIG. 2 is a similar view showing the bag in its collapsed and closed condition, and FIG. 3 is a left, front isometric view on a much smaller scale showing the extended and open bag mounted to the back of an automobile seat.

DESCRIPTION OF THE PREFERRED EMBODIMENT

Referring to the drawing, our utility bag comprises a bag section 10 having a generally rectangular front wall 10a, a rectangular rear wall 10b and a pair of opposite rectangular side walls 10c, all of the walls being of flexible sheet material. A frame 12 hemmed into the upper edges of those walls defines the rim of the bag. Frame 12 is hinged at the opposite sides of the bag at 12a so that the bag section 10 can assume a closed condition as shown in FIG. 1 or an open condition as depicted in FIGS. 2 and 3. Preferably, an adjustable strap 15 is provided at the top of bag section 10, the opposite ends of the strap being secured to the side walls 10c. Using strap 15, the bag may be suspended from a suitable support; see FIG. 3.

The bottom of bag section 10 is closed by a bottom wall structure shown generally at 14. Structure 14 comprises a generally rectangular upper panel 16 which is secured at its perimeter to the lower edges of the bag section walls 10a to 10c. Thus, panel 16 functions as the actual bottom wall of bag section 10. The structure 14 also includes a bottom panel 18 which is coextensive with panel 16. Panel 18 is connected at its perimeter to panel 16 by a generally rectangular front panel 22 (FIG. 3) and a pair of opposite, rectangular side panels 24. These panels 16, 18, 22 and 24 thus define a generally rectangular compartment or receptacle 26 at the underside of bag section 10.

When the bottom wall structure 14 is in its extended condition such that compartment 26 is open as shown in FIGS. 2 and 3, it is adapted to receive a container such as the container C shown in phantom in FIGS. 2 and 3 which contains disposable articles. These articles may be removed from the container through an opening 28 provided in the bottom panel 18 of the wall structure 14. The bag specifically illustrated is arranged to support a container C holding facial tissues T. Hence, the opening 28 in panel 18 is a relatively long slot so that when the container is inserted upside down into compartment 26, tissues T can be pulled from the container through the opening 28.

Container C may be retained within compartment 26 by means of a strap 32 having one end anchored to the rear edge of panel 18 and its opposite end releasably fastened to the rear wall 10b of bag section 10. In the bag specifically shown, such attachment is provided by mating hook and loop fastener pads 34a and 34b attached to wall 10b and strap 32, respectively.

When the compartment 26 is not needed, the side panels 24 of the bottom wall structure 14 may be folded inwardly along the fold lines $L_1$. This draws the bottom panel 18 against the upper panel 16 as shown in FIG. 2. Panels 24 may be held in their folded positions by mating hook and loop fastener pads 38a and 38b attached to the outsides of panels 24 on opposite sides of fold lines $L_1$, e.g., at the respective upper and lower rear corners of those panels. Also, if desired, a fastener pad 34c similar to pad 34b may be provided near the fixed end of strap 32 for releasably securing panel 18 to wall 10b of bag section 10 midway along that panel.

To fully collapse the bottom wall structure 14, the bottom panel 18 is then folded along the fold line $L_2$ which extends the entire length of that panel and is spaced from the front edge of that panel somewhat less than half the height of compartment 26. This draws the forward edge margin of panel 18 up against the underside of panel 16 so that the wall structure 14 is fully collapsed as shown in FIG. 2. Panel 18 may be maintained in this folded condition by mating hook and loop fasteners 42a and 42b attached to the underside of panel 18 on opposite sides of the fold line $L_2$. The illustrated bag has such fastener pad pairs located at the opposite ends of panel 18 and midway along the panel.

In actual practice, the cost of making and assembling bag 10 can be minimized by forming the front wall 10a and lower panel 18 of a single sheet of material. Likewise, the side wall 10c and side panel 24 at each side of the bag may be formed from a single sheet of material. So too, the rear wall 10b and the upper panel 16 may constitute a single sheet of material. The panels are then heat sealed or stitched together along seam lines S which extend down the four corners of the bag, around the sides and front of the bag at the top of compartment 26, as well as at the opposite ends of bottom panel 18.

In use, the bag may be suspended by its strap 15 from a suitable support. For example, FIG. 3 shows the bag suspended from an automobile headrest H so that the bag hangs down behind the front seat F of the automobile so that the opening into compartment 26 is concealed by the seat. In such an application, the bag may be used to dispense tissues T and to temporarily store those tissues after they are used. When the bag is not dispensing articles, the bottom wall structure 14 may be folded to its collapsed condition shown in FIG. 2, in which event, the bag may be used simply to temporarily store litter. In both cases, due to the bottom wall structure 14, the bag is fully reinforced at its underside to prevent the bag from sagging and to maintain the bag's basic rectangular configuration.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It will also be understood that the following claims are intended to cover all of the generic and specific features of the invention described herein.

What is claimed is:

1. A portable utility bag comprising plurality of flexible walls defining a first receptacle having an opening thereinto;

plurality of flexible panels attached to each other and to at least some of said flexible walls to define a second receptacle adjacent to the first receptacle and having an opening thereinto oriented perpendicular to the opening into the first receptacle, and means fixed to the plurality of panels for suspending the bag so that the opening into the first receptacle faces upward, said plurality of panels including a front panel, a bottom panel, and a pair of opposite side panels connecting said front and bottom panels, said side and bottom panels being foldable at fold lines extending along the respective side and bottom panels so as to collapse said second receptacle; and further including fastening means for releasably fastening said second receptacle in its collapsed condition.

2. The bag defined in claim 1 wherein said fastening means include mating hook and loop fastener pads affixed to each of said side and lower panels on opposite sides of the fold line associated therewith.

3. The bag defined in claim 1 and further including a relatively, rigid container snugly received in said second receptacle.

4. The bag defined in claim 2 and further including retainer means releasably bridging the opening into the second receptacle for retaining the container in said second receptacle.

5. The bag defined in claim 1 including means defining a passage through one of said plurality of flexible panels so that articles can be drawn from a container situated in the second receptacle.

* * * * *